United States Patent [19]

Michaluk

[11] Patent Number: 5,116,519
[45] Date of Patent: May 26, 1992

[54] SEPARATOR WITH OUTLETS IN A SPIRAL GROOVE FOR SEPARATING A MIXTURE OF LIQUIDS

[75] Inventor: Peter G. Michaluk, Gloucester, England

[73] Assignee: Serck Baker Limited, Dorset, England

[21] Appl. No.: 663,887

[22] PCT Filed: Sep. 5, 1989

[86] PCT No.: PCT/GB89/01033
§ 371 Date: Mar. 15, 1991
§ 102(e) Date: Mar. 15, 1991

[87] PCT Pub. No.: WO90/02593
PCT Pub. Date: Mar. 22, 1990

[30] Foreign Application Priority Data

Sep. 9, 1988 [GB] United Kingdom ............... 8821161

[51] Int. Cl.[5] .......................................... B01D 17/038
[52] U.S. Cl. ........................... 210/788; 209/144; 209/211; 210/512.1; 210/787
[58] Field of Search ............. 210/512.1, 788, 787; 209/211, 144

[56] References Cited

U.S. PATENT DOCUMENTS

| 2,768,745 | 10/1956 | Albertson | 209/211 |
| 3,399,770 | 9/1968 | Salomon | 209/211 |
| 3,400,770 | 9/1968 | Matson | 173/32 |
| 4,392,950 | 7/1983 | Beery | 209/211 |
| 4,810,382 | 3/1989 | Colman et al. | 210/512.1 |
| 4,820,414 | 4/1989 | Carroll et al. | 210/512.1 |
| 4,995,989 | 2/1991 | Carroll et al. | 210/788 |

FOREIGN PATENT DOCUMENTS

| 0424561 | 5/1911 | France. |
| 8501454 | 4/1985 | World Int. Prop. O.. |
| 8607549 | 12/1986 | World Int. Prop. O.. |

Primary Examiner—W. Gary Jones
Assistant Examiner—Sun Uk Kim
Attorney, Agent, or Firm—Nixon & Vanderhye

[57] ABSTRACT

A separator for separating a mixture of liquids into a more dense component and a less dense component. It comprises a tube (52, 53, 54) of decreasing cross-section, at least one tangential inlet (59, 60), and outlet (57, 58) for the less dense component on the tube axis, and an outlet for the more dense component on the tube wall in the form of a spiral groove (61), preferably with a plurality of outlet ports (62) at the groove base. The separator may for example be used for separating a small volume of oil from water or, with suitable adjustment, a small volume of water from oil.

16 Claims, 1 Drawing Sheet

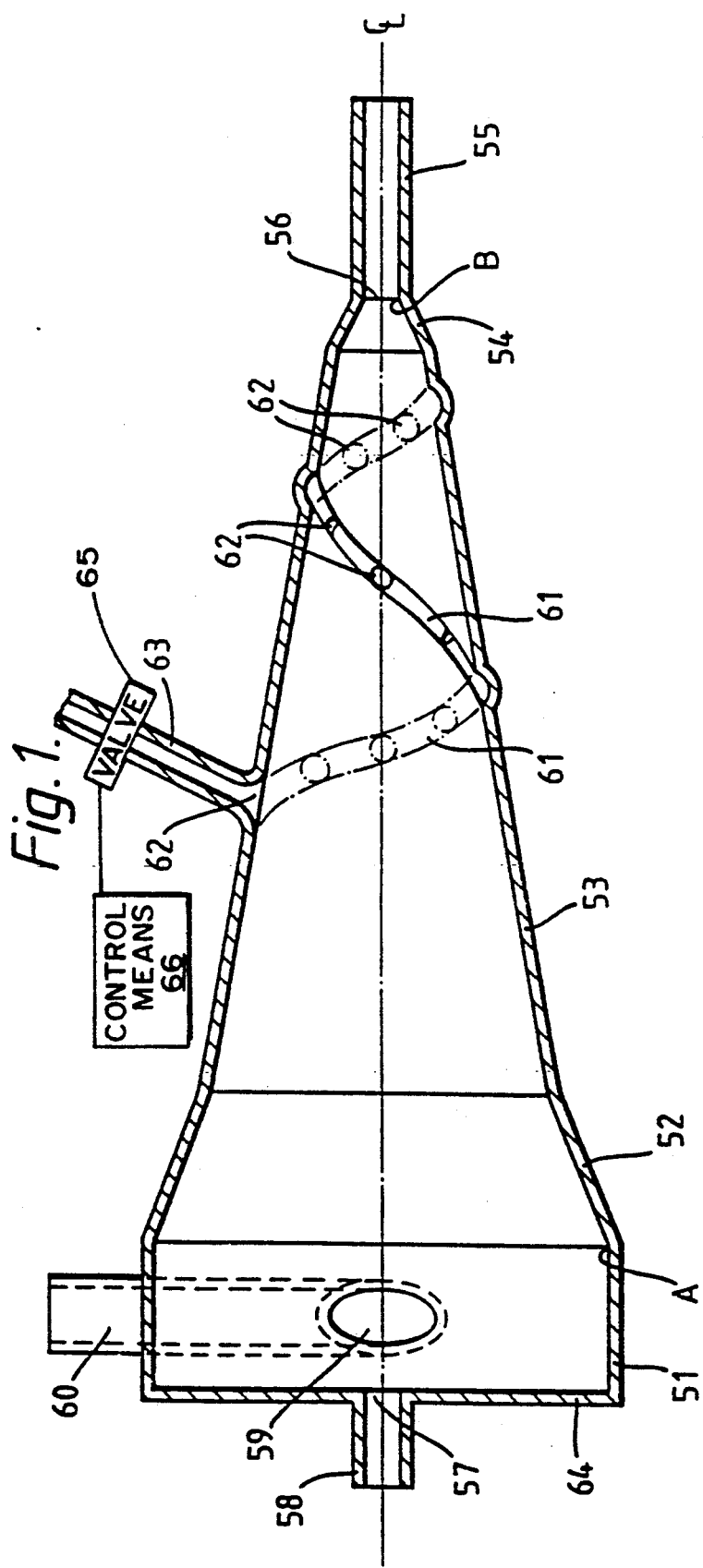
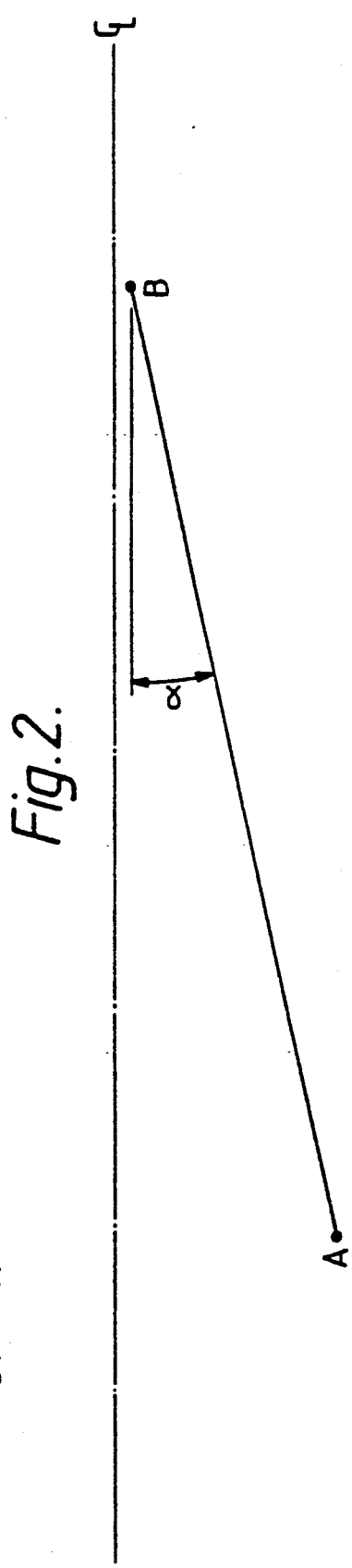

SEPARATOR WITH OUTLETS IN A SPIRAL GROOVE FOR SEPARATING A MIXTURE OF LIQUIDS

BACKGROUND OF THE INVENTION

1. Field of the Invention

This invention relates to a separator. In particular it relates to a separator for separating a relatively small volume e.g. up to 20% of a liquid from a larger volume of another liquid of different density. For example the separator may be used for separating small volumes of oil from produced water from an oil production platform so that the separated water may be returned in a virtually clean condition to the sea. Alternatively the separator, with appropriate adjustments, may be used to separate small quantities of water from crude oil before the oil is subsequently processed.

2. Discussion of Prior Art

It is known to construct a separator for such use in tubular form of reducing circular cross-section from a wide end to a narrow end, having at least one tangentially-disposed inlet at or adjacent the wide end for introducing at relatively high velocity the mixture of liquids to be separated into the separator, and two outlets, the first disposed on the axis of the separator at the wide end for the removal of the less dense liquid component and the second disposed at or adjacent the narrow end for the removal of the more dense liquid component.

During use of such a separator the less dense component, for example oil, moves towards the axis and forms a core and this moves towards the wide end, while the more dense component, e.g. water, moves towards the wall of the separator and towards the narrow end. However it has been found that in some situations not all the less dense component in the central core moves towards the wide end; some of it remains stationary and some even moves towards the narrow end where it mixes with and contaminates the more dense component.

It is an object of the present invention to provide a separator in which the above disadvantageous effects are substantially reduced or overcome.

SUMMARY OF THE INVENTION

In accordance with the invention a separator for separating a mixture of liquids into a less dense component and a more dense component comprises an elongated tube of circular cross-section reducing from a wide end to a narrow end, at least one tangentially-disposed inlet at or adjacent the wide end for the introduction at relatively high velocity of a mixture of liquids to be separated, at least one outlet for the removal of the less dense component on the axis of the separator and at least one outlet for the removal of the more dense component characterised in that the outlet for the removal of the more dense component is in the form of a spiral groove formed within the wall of the tube and extending from a predetermined position between the two ends towards the narrow end, at least one outlet port being positioned in the base of the groove. Preferably a plurality of outlet ports is provided, each being controlled by a valve capable of varying the flow of liquid through the respective port. The or each valve may be controlled manually or automatically in order to control the pressure or flow of the liquid, under the influence of one or more sensors for detecting changes in various parameters such as liquid flow rate, mixture composition i.e. relative proportions of each component, or pressure at various positions.

In accordance with another aspect of the invention a method of separating a mixture of liquids into a less dense component and a more dense component comprises introducing the mixture to be separated at relatively high velocity into at least one tangentially-disposed inlet at or adjacent the wide end of an elongated separator tube of circular cross-section which reduces from a wide end to a narrow end, and removing the less dense component through an outlet on the axis of the separator tube, characterised in that the more dense component is removed through an outlet in the form of a spiral groove formed within the wall of the tube and extending from a predetermined position between the two ends towards the narrow end, at least one outlet port being positioned in the base of the groove.

BRIEF DESCRIPTION OF DRAWINGS

One embodiment of the invention will now be described by way of example only with reference to the accompanying drawings of which:

FIG. 1 shows a simplified longitudinal cross-section through a separator according to the first embodiment of the invention; and FIG. 2 illustrates the convergence angle

DETAILED DISCUSSION OF PREFERRED EMBODIMENTS

As shown in FIG. 1 the separator comprises an inlet section 51, an elongated tapering tube comprising first (52), second (53) and third (54) conical sections, and an outlet tube 55, all arranged coaxially.

The inlet section 51 in the form of a short cylindrical tube is provided with two tangentially-disposed inlet ports 59, diametrically opposed to one another (only one is shown in FIG. 2 for clarity) leading from inlet pipes 60 through which a mixture of produced water from an oil production platform and up to 20% oil may be fed under pressure to the separator. The inlet section 51 is also provided with an end cover 64 having an outlet 57 disposed in the axis of the separator through which separated oil may be removed through an outlet pipe 58. A suitable valve and/or pump (not shown) may be provided in the outlet pipe 58 as required in order to control the pressure of the outflowing liquid.

The inlet section is connected to a first conical section 52, which in turn is connected to a second conical section 53, which in turn is connected to a third conical section 54 so that the main body of the separator comprising the three sections 52, 53 and 54, has an overall reducing cross-section. The end 56 of the third section 54, (which is also the narrow end of the separator) is connected to a cylindrical outlet tube 55. The junction of the third section and the outlet tube provides a further outlet for the oil which may be fed away through the outlet tube 55. A valve and/or a pump (not shown) may be connected to the outlet tube 55 as required in order to control the pressure of the outflowing liquid.

The interior surface of the second section 53 is provided with a helical groove 61 which extends from a position approximately mid-way along the length of the second section 53 to end adjacent the junction within the third section 54. At the base of the groove 61 is provided a plurality of spaced apart outlet ports 62 through which water may be removed from the separator through the outlet pipes 63. Suitable valves 65 and valve control means 66 and/or pumps may be provided in the outlet pipes as required in order to control the pressure of the outflowing liquid.

In use of the separator the mixture of water and oil is fed at high velocity into the separator through the inlet ports 59. Under the influence of gravitational forces created by the rotational flow in the separator the oil moves towards the central axis and the water towards the wall. By suitable operation of the pumps or valves in the outlet pipes 58, 63 and 55 and central core of crude oil may be made to flow towards the wide end of the separator and out through the outlet port 57 formed in the end cover 64, and towards the narrow end and out through the outlet port 56 while the cleaned water is removed from the outlet 62 in the wall of the second section. The separator outlet valves may be operated to control the flow of liquids from the separator depending on the relative proportions of oil and water in the original mixture. For example if the mixture contained less than 10% oil and the objective was to obtain virtually clean water, the separator would be operated with most, if not all, valves in the outlet pipes 63 attached to the outlet 62 in the wall, fully open, and with the valves attached to the outlet pipes 55 and 58 at the narrow and wide ends respectively partially closed. In some situations the separator may be operated with the valve attached to outlet 58 at the wide end fully closed. Alternatively, if the mixture to be separated contains a major portion of oil, then many of the valves attached to the outlet pipes 63 attached to the outlet 62 in the wall would be fully or partially closed, and the valves attached to the outlet pipes 55 and 58 at the narrow and wide ends respectively fully open.

Whilst one and a half spirals of the groove 61 have been shown diagramatically in the drawing other numbers of spirals may be used as required. Additionally more than one helical groove may be provided, arranged in end-to-end or side-by-side relationship.

The separator as described and illustrated has an interior surface of multi-conical form. However other configurations may be used: for example, the surface may have a longitudinal cross-section which is a curve or a straight line. Whatever the shape of the separator the convergence angle from the point (A) the tube starts to decrease in diameter to the point where it finishes (B) is in the range from about $\frac{1}{2}°$ to 10°, preferably about 2°. The convergence angle $\alpha$ is the angle between the imaginary line between the two points A and B and the longitudinal axis of the separator as illustrated in FIG. 2.

I claim:

1. A separator for separating a mixture of liquids into a less dense component and a more dense component said separator comprising:
   an elongated tube of circular cross-section reducing from a wide end to a narrow end, at least one tangentially-disposed inlet at or adjacent the wide end for the introduction at relatively high velocity of a mixture of liquids to be separated;
   at least one outlet for the removal of the less dense component on the axis of the separator; and
   at least one outlet for the removal of the more dense component wherein said outlet for the removal of the more dense component is in the form of a spiral groove formed within the wall of the tube and extending from a predetermined position between the two ends towards the narrow end, at least one outlet port being positioned in the base of the groove.

2. A separator according to claim 1 wherein a plurality of outlet ports is provided.

3. A separator according to claim 2 wherein the outlet ports are spaced apart along the length of the groove.

4. A separator according to claim 1 wherein valve means is provided for each of the outlet ports for controlling the flow of liquid through the respective ports.

5. A separator according to claim 4 wherein control means is provided for controlling the valve means in response to liquid flow rate, mixture composition or pressure at various positions.

6. A separator according to claim 1 wherein said spiral groove extends for one and a half turns.

7. A separator according to claim 1 wherein a plurality of spiral grooves is provided.

8. A method of separating a mixture of liquids into a less dense component and a more dense component, said method comprising the steps of:
   introducing the mixture to be separated at relatively high velocity into at least one tangentially-disposed inlet at or adjacent the wide end of an elongated separator tube of circular cross-section which reduces from a wide end to a narrow end; and
   removing the less dense component through an outlet on the axis of the separator tube, wherein the more dense component is removed through an outlet in the form of a spiral groove formed within the wall of the tube and extending from a predetermined position between the two ends towards the narrow end, at least one outlet port being positioned in the base of the groove.

9. A method according to claim 8, wherein a plurality of outlet ports is provided.

10. A method according to claim 9 wherein said outlet ports are spaced-apart along the length of the groove.

11. A method according to claim 8 wherein valve means is provided for each of the outlet ports, said valve means being operated to control the flow of liquid through the respective ports.

12. A method according to claim 11 wherein control means is provided for controlling the valve means and operates in response to liquid flow rate, mixture composition or pressure at various positions.

13. A method according to claim 8 wherein the spiral groove extends for one and a half turns.

14. A method according to claim 8 wherein a plurality of spiral grooves is provided.

15. A separator for separating a mixture of liquids into a less dense component and a more dense component, said separator comprising:
    an elongated tube of having an inner surface, said tube reducing from a wide end to a narrow end along an axis;
    at least one tangentially-disposed inlet in the vicinity of said wide end, said inlet supplied with said mixture of liquids at a relatively high velocity;
    at least one outlet for the removal of said less dense component on said axis of said tube; and
    at least one outlet for the removal of said more dense component comprising:
      a spiral groove in said inner surface of said tube, said groove extending from a position between said ends of said tube towards said narrow end; and
      at least one outlet port positioned in fluid communication with said groove.

16. A method of separating a mixture of liquids into a less dense component and a more dense component, said method comprising the steps of:

providing a separator tube reducing from a wide end to a narrow end along an axis, said tube having an inner surface with a spiral groove therein, said groove extending from a position between said ends towards said narrow end, said groove having at least one outlet port located therein;

introducing the mixture to be separated at a relatively high velocity in a tangential direction with respect to said axis;

withdrawing said less dense liquid along said axis of said separator tube; and withdrawing said more dense liquid from said at least one outlet port.

* * * * *